(12) United States Patent
Huang

(10) Patent No.: US 9,779,683 B2
(45) Date of Patent: Oct. 3, 2017

(54) DISPLAY PANEL AND GOA CIRCUIT

(71) Applicant: SHENZHEN CHINA STAR OPTOELECTRONICS TECHNOLOGY CO., LTD., Shenzhen, Guangdong (CN)

(72) Inventor: Xiaoyu Huang, Guangdong (CN)

(73) Assignee: SHENZHEN CHINA STAR OPTOELECTRONICS TECHNOLOGY CO., LTD., Shenzhen, Guangdong (CN)

( * ) Notice: Subject to any disclaimer, the term of this patent is extended or adjusted under 35 U.S.C. 154(b) by 94 days.

(21) Appl. No.: 14/906,374

(22) PCT Filed: Dec. 24, 2015

(86) PCT No.: PCT/CN2015/098768
§ 371 (c)(1),
(2) Date: Jan. 20, 2016

(87) PCT Pub. No.: WO2017/088229
PCT Pub. Date: Jun. 1, 2017

(65) Prior Publication Data
US 2017/0236478 A1 Aug. 17, 2017

(30) Foreign Application Priority Data
Nov. 26, 2015 (CN) .......................... 2015 1 8434376

(51) Int. Cl.
G09G 3/36 (2006.01)
G02F 1/1345 (2006.01)
G02F 1/1368 (2006.01)

(52) U.S. Cl.
CPC ......... *G09G 3/3677* (2013.01); *G02F 1/1368* (2013.01); *G02F 1/13454* (2013.01);
(Continued)

(58) Field of Classification Search
CPC ............... G09G 3/3648; G09G 3/3677; G09G 2310/0251; G09G 2310/0248; G02F 1/1368
See application file for complete search history.

(56) References Cited

U.S. PATENT DOCUMENTS 6,064,363 A 5/2000 Kwon
6,542,142 B2 4/2003 Yumoto
(Continued)

FOREIGN PATENT DOCUMENTS

CN 101697269 A 4/2010
CN 103413532 A 11/2013
(Continued)

*Primary Examiner* — Shaheda Abdin
(74) *Attorney, Agent, or Firm* — Ladas & Parry LLP

(57) ABSTRACT

The present invention relates to a display panel, having a display area and a fan-out area, and a GOA circuit. The GOA circuit includes a plurality of stage pre-charge modules, arranged for connecting output terminals of two adjacent gates in the GOA circuit in the fan-out area to two corresponding adjacent gate line outputs in the display area respectively. Each of the stage pre-charge modules includes a first thin film transistor, a second thin film transistor, a third thin film transistor, a fourth thin film transistor, a fifth thin film transistor and a sixth thin film transistor.

9 Claims, 2 Drawing Sheets

(52) U.S. Cl.
CPC ... *G09G 3/3648* (2013.01); *G09G 2310/0248* (2013.01); *G09G 2310/0251* (2013.01); *G09G 2310/0289* (2013.01); *G09G 2320/0209* (2013.01); *G09G 2320/0252* (2013.01)

(56) References Cited

U.S. PATENT DOCUMENTS

| | | |
|---|---|---|
| 9,378,698 B2 | 6/2016 | Wang |
| 2005/0264498 A1 | 12/2005 | Asano |
| 2006/0114209 A1* | 6/2006 | Kim ................... G09G 3/3611 345/94 |
| 2010/0231497 A1* | 9/2010 | Liao ................... G09G 3/3677 345/100 |
| 2011/0169793 A1* | 7/2011 | Chen ................... G09G 3/3677 345/205 |
| 2012/0293401 A1* | 11/2012 | Li ....................... G11C 19/184 345/100 |

FOREIGN PATENT DOCUMENTS

| | | |
|---|---|---|
| CN | 103943066 A | 7/2014 |
| JP | H11242207 A | 9/1999 |

\* cited by examiner

DISPLAY PANEL AND GOA CIRCUIT

FIELD OF THE INVENTION

The present invention relates to a display panel and a GOA (Gate Driver On Array) circuit, particularly to a display panel and a GOA circuit of a thin film transistor liquid crystal display (TFT-LCD).

BACKGROUND OF THE INVENTION

The basic structure of a traditional TFT-LCD display panel using GOA (Gate Driver On Array) is shown in FIG. 1. The display panel 1 includes a display area 10, a fan-out area 11, source-chip on films (S-COF) 12, a printed circuit board (PCB) 13, and a GOA circuit is disposed between the display area 10 and the fan-out area 11.

The gate driver of the traditional liquid crystal panel scans the thin film transistor (TFT), and charges a pixel electrode through a data line. A liquid crystal rotates under the influence of an electric field to guide light to display. The long charging time leads to a long liquid crystal response time, and makes more crosstalk between the pixel electrodes.

Therefore, it is needed to provide a new display panel and a new GOA circuit, to increase the charging speed of the pixel.

SUMMARY OF THE INVENTION

The present invention adds additional logic units to the fan-out area on the gate side of the traditional GOQA circuit, to realize pre-charge between adjacent gate lines, and to increase the pre-charge speed of the pixel.

A display panel is provided according to an embodiment of the present invention, having a display area and a fan-out area, and a GOA (Gate Driver On Array, GOA) circuit. The display panel includes a plurality of stage pre-charge modules, arranged for connecting output terminals of two adjacent gates in the GOA circuit in the fan-out area to two corresponding adjacent gate line outputs in the display area respectively, each of the stage pre-charge modules includes a first thin film transistor, a source, and a gate of the first thin film transistor being connected to a first output terminal at one of the two adjacent gates, a drain of the first thin film transistor being connected to a first gate line output; a second thin film transistor, a gate of the second thin film transistor being connected to the first output terminal at the one gate, a drain of the second thin film transistor being connected to a previous stage pre-charge module; a third thin film transistor, a gate of the third thin film transistor being connected to the first output terminal at the one gate, a drain of the third thin film transistor being connected to the first gate line output; a fourth thin film transistor, a drain of the fourth thin film transistor being connected to a source of the third thin film transistor; a gate of the fourth thin film transistor being connected to a second output terminal at the other of the two adjacent gates, a source of the fourth thin film transistor being connected to a second gate line output; a fifth thin film transistor, a gate of the fifth thin film transistor being connected to the second output terminal at the other gate, a source of the fifth thin film transistor being connected to the second output terminal, a drain of the fifth thin film transistor being connected to the second gate line output; and a sixth thin film transistor, a gate of the sixth thin film transistor being connected to the second output terminal at the other gate, a drain of the sixth thin film transistor being connected to the second gate line output, a source of the sixth thin film transistor being connected to a next stage pre-charge module.

Preferably, when the first gate output terminal is a high voltage level bit, the second gate output terminal is a low voltage level bit, the first thin film transistor, the third thin film transistor, and the fourth thin film transistor are turned on, the second thin film transistor, the fifth thin film transistor, and the sixth thin film transistor are turned off, and the first gate line output and the second gate line output are both high voltage level bits.

Preferably, when the first gate output terminal is a low voltage level bit, the second gate output terminal is a high voltage level bit, the first thin film transistor, the third thin film transistor, and the fourth thin film transistor are turned off, the second thin film transistor, the fifth thin film transistor, and the sixth thin film transistor are turned on, and the first gate line output is a low voltage level bit, the second gate line output is a high voltage level bit.

Preferably, when the first gate output terminal and the second gate output terminal are both low voltage level bits, the first thin film transistor, the third thin film transistor, the fifth thin film transistor, and the sixth thin film transistor are turned off, the second thin film transistor and the fourth thin film transistor are turned on, and the first gate line output and the second gate line output are both low voltage level bits.

The present invention realizes the pre-charge in the GOA circuit structure, which increases the charge speed, reduces the response time of the liquid crystal, and reduces the crosstalk phenomenon between the pixel electrodes.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF THE PREFERRED EMBODIMENTS

Figure 1:
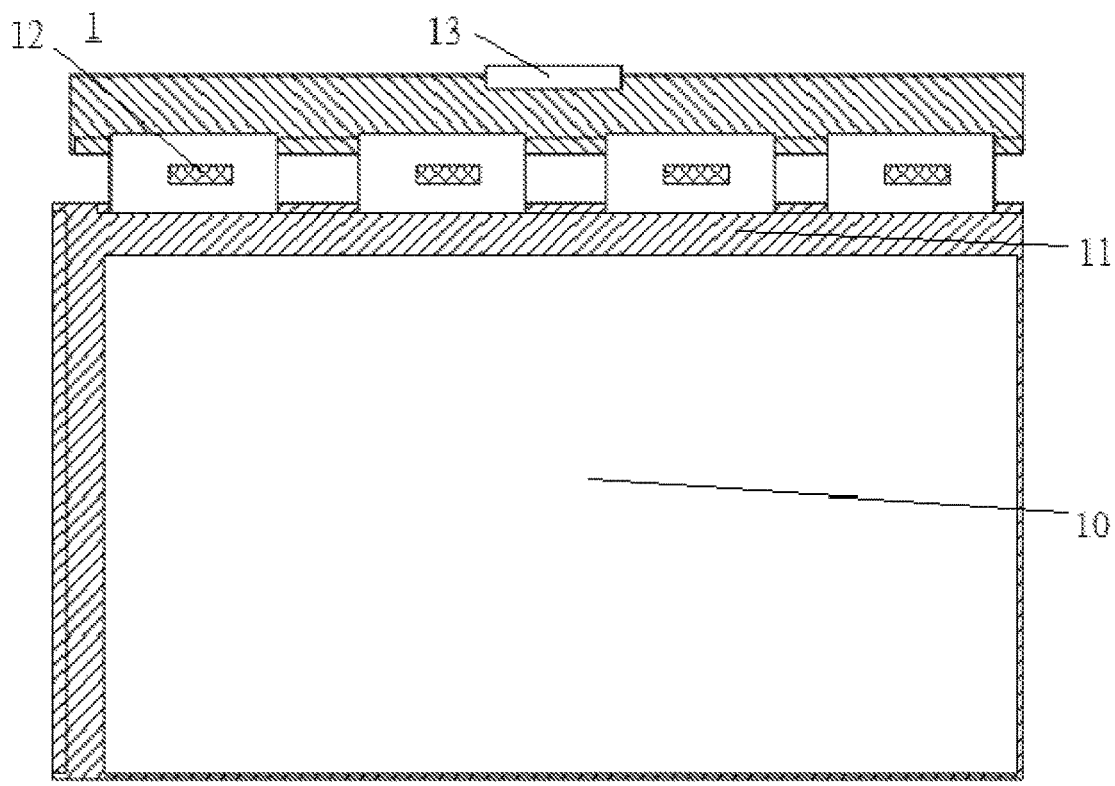
FIG. 1 illustrates a structural diagram of the traditional gate drive panel.

As used in this specification the term "embodiment" means that instance, an example or illustration. In addition, for the articles in this specification and the appended claims, "a" or "an" in general can be interpreted as "one or more" unless specified otherwise or clear from context to determine the singular form.

In the drawings, the same reference numerals denote units with similar structures.

Figure 2:
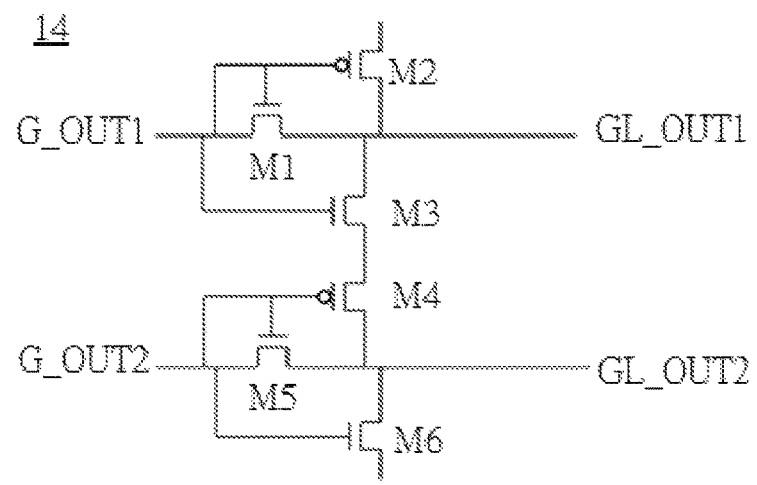
FIG. 2 illustrates a circuit diagram of the pre-charge module according to an embodiment of the present invention.

As the display panel structure shown in FIG. 1, a display panel 1 is provided according to an embodiment of the present invention, having a display area 10 and a fan-out area 11, and a GOA (Gate On Array, GOA) circuit (not shown). The GOA circuit is disposed in the display area 10 and the fan-out area 11, including a plurality of stage pre-charge modules 14 (not shown in FIG. 1). FIG. 2 illustrates a circuit diagram of the pre-charge module 14, arranged for connecting output terminals of two adjacent gates in the GOA circuit in the fan-out area 11 to two corresponding adjacent gate line outputs in the display area 10 respectively. Please refer to FIG. 2, which illustrates a circuit diagram of the pre-charge module 14 according to an embodiment of the present invention. As shown in FIG. 2, each pre-charge module 14 includes a first thin film transistor M1, a source and a gate of the first thin film transistor M1 are connected to a first output terminal G_OUT1 at the gate of the GOA circuit in the fan-out area, and a drain of the first thin film transistor M1 is connected to a first gate line output GL_OUT1; a second thin film transistor M2, a gate of the second thin film transistor M2 is connected to the first output terminal G_OUT1 at the gate, a drain of the second thin film transistor M2 is connected to a previous stage pre-charge module (not shown); a third thin film transistor M3, a gate of the third thin film transistor M3 is connected to the first output terminal G_OUT1 at the gate, a drain of the third thin film transistor M3 is connected to the first gate line output GL_OUT1; a fourth thin film transistor M4, a drain of the fourth thin film transistor M4 is connected to a source of the third thin film transistor M3; a gate of the fourth thin film transistor M4 is connected to a second output terminal G_OUT2 at the other gate of the GOA circuit in the fan-out area, a source of the fourth thin film transistor M4 is connected to a second gate line output GL_OUT2; a fifth thin film transistor M5, a gate of the fifth thin film transistor M5 is connected to the second output terminal G_OUT2 at the other gate, a source of the fifth thin film transistor M5 is connected to the second output terminal G_OUT2, a drain of the fifth thin film transistor M5 is connected to the second gate line output GL_OUT2; and a sixth thin film transistor M6, a gate of the sixth thin film transistor M6 is connected to the second output terminal G_OUT2 at the other gate, a drain of the sixth thin film transistor M6 is connected to the second gate line output GL_OUT2, a source of the sixth thin film transistor M6 is connected to a next stage pre-charge module (not shown).

When the first gate output terminal G_OUT1 is a high voltage level bit VH, the second gate output terminal G_OUT2 is a low voltage level bit VL, the first thin film transistor M1, the third thin film transistor M3, and the fourth thin film transistor M4 are turned on, the second thin film transistor M2, the fifth thin film transistor M5, and the sixth thin film transistor M6 are turned off, and the first gate line output GL_OUT1 and the second gate line output GL_OUT2 are both high voltage level bit VH. When he first gate output terminal G_OUT1 is a low voltage level bit VL, the second gate output terminal G_OUT2 is a high voltage level bit VH, the first thin film transistor M1, the third thin film transistor M3, and the fourth thin film transistor M4 are turned off, the second thin film transistor M2, the fifth thin film transistor M5, and the sixth thin film transistor M6 are turned on, and the first gate line output GL_OUT1 is the low voltage level bit VL, the second gate line output GL_OUT2 is the high voltage level bit VH. When the first gate output terminal G_OUT1 and the second gate output terminal G_OUT2 are both low voltage level bits VL, the first thin film transistor M1, the third thin film transistor M3, the fifth thin film transistor M5, and the sixth thin film transistor M6 are turned off, the second thin film transistor M2 and the fourth thin film transistor M4 are turned on, and the first gate line output GL_OUT1 and the second gate line output GL_OUT2 are both low voltage level bits VL.

Figure 3:
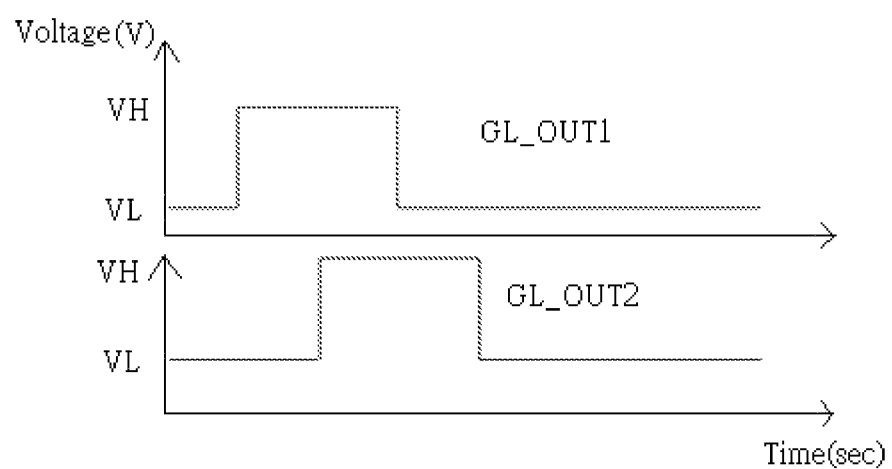
FIG. 3 illustrates waveforms of the gate line signals of the pre-charge module according to the embodiment of the present invention.

Please refer to FIG. 3, which illustrates waveforms of the gate line signals of the pre-charge module 14 according to the embodiment of the present invention. As shown in FIG. 3, the waveforms of the first gate line output GL_OUT1 and the second gate line output GL_OUT2 are respectively illustrated. As shown in FIG. 3, the charge waveforms at G_OUT1 and GL_OUT2 partly overlap, that is, the second gate line starts charging before the first gate line completes charging, thereby increase the charge efficiency; thus the present invention realizes the pre-charge in the GOA circuit structure, which increases the charge speed, reduces the response time of the liquid crystal, and reduces the crosstalk phenomenon between the pixel electrodes. Thus the present invention realizes the pre-charge in the GOA circuit structure, which increases the charge speed, reduces the response time of the liquid crystal, and reduces the crosstalk phenomenon between the pixel electrodes.

In summary, although the preferable embodiments of the present invention have been disclosed above, the embodiments are not intended to limit the present invention. A person of ordinary skill in the art, without departing from the spirit and scope of the present invention, can make various modifications and variations. Therefore, the scope of the invention is defined in the claims.

What is claimed is:

1. A display panel, having a display area and a fan-out area, and a GOA (Gate On Array, GOA) circuit, the display panel comprising:
   a plurality of stage pre-charge modules, arranged for connecting output terminals of two adjacent gates in the GOA circuit in the fan-out area to two corresponding adjacent gate line outputs in the display area respectively, each of the stage pre-charge modules comprises:
   a first thin film transistor, a source and a gate of the first thin film transistor being connected to a first output terminal at one of the two adjacent gates, a drain of the first thin film transistor being connected to a first gate line output;
   a second thin film transistor, a gate of the second thin film transistor being connected to the first output terminal at the one gate, a drain of the second thin film transistor being connected to a previous stage pre-charge module;
   a third thin film transistor, a gate of the third thin film transistor being connected to the first output terminal at the one gate, a drain of the third thin film transistor being connected to the first gate line output;
   a fourth thin film transistor, a drain of the fourth thin film transistor being connected to a source of the third thin film transistor; a gate of the fourth thin film transistor being connected to a second output terminal at the other of the two adjacent gates, a source of the fourth thin film transistor being connected to a second gate line output;
   a fifth thin film transistor, a gate of the fifth thin film transistor being connected to the second output terminal at the other gate, a source of the fifth thin film transistor being connected to the second output terminal, a drain of the fifth thin film transistor being connected to the second gate line output; and
   a sixth thin film transistor, a gate of the sixth thin film transistor being connected to the second output terminal at the other gate, a drain of the sixth thin film transistor being connected to the second gate line output, a source of the sixth thin film transistor being connected to a next stage pre-charge module;
   wherein charge waveforms of the first gate output terminal and the second gate output terminal partly overlap.

2. A display panel, having a display area and a fan-out area, and a GOA circuit, the display panel comprising:
- a plurality of stage pre-charge modules, arranged for connecting output terminals of two adjacent gates in the GOA circuit in the fan-out area to two corresponding adjacent gate line outputs in the display area respectively, each of the stage pre-charge modules comprises:
- a first thin film transistor, a source and a gate of the first thin film transistor being connected to a first output terminal at one of the two adjacent gates, a drain of the first thin film transistor being connected to a first gate line output;
- a second thin film transistor, a gate of the second thin film transistor being connected to the first output terminal at the one gate, a drain of the second thin film transistor being connected to a previous stage pre-charge module;
- a third thin film transistor, a gate of the third thin film transistor being connected to the first output terminal at the one gate, a drain of the third thin film transistor being connected to the first gate line output;
- a fourth thin film transistor, a drain of the fourth thin film transistor being connected to a source of the third thin film transistor; a gate of the fourth thin film transistor being connected to a second output terminal at the other of the two adjacent gates, a source of the fourth thin film transistor being connected to a second gate line output;
- a fifth thin film transistor, a gate of the fifth thin film transistor being connected to the second output terminal at the other gate, a source of the fifth thin film transistor being connected to the second output terminal, a drain of the fifth thin film transistor being connected to the second gate line output; and
- a sixth thin film transistor, a gate of the sixth thin film transistor being connected to the second output terminal at the other gate, a drain of the sixth thin film transistor being connected to the second gate line output, a source of the sixth thin film transistor being connected to a next stage pre-charge module.

3. The display panel of claim 2, wherein when the first gate output terminal is a high voltage level bit, the second gate output terminal is a low voltage level bit, the first thin film transistor, the third thin film transistor, and the fourth thin film transistor are turned on, the second thin film transistor, the fifth thin film transistor, and the sixth thin film transistor are turned off, and the first gate line output and the second gate line output are both high voltage level bits.

4. The display panel of claim 2, wherein when the first gate output terminal is a low voltage level bit, the second gate output terminal is a high voltage level bit, the first thin film transistor, the third thin film transistor, and the fourth thin film transistor are turned off, the second thin film transistor, the fifth thin film transistor, and the sixth thin film transistor are turned on, and the first gate line output is a low voltage level bit, the second gate line output is a high voltage level bit.

5. The display panel of claim 2, wherein when the first gate output terminal and the second gate output terminal are both low voltage level bits, the first thin film transistor, the third thin film transistor, the fifth thin film transistor, and the sixth thin film transistor are turned off, the second thin film transistor and the fourth thin film transistor are turned on, and the first gate line output and the second gate line output are both low voltage level bits.

6. A GOA circuit, used in a display device, the display device having a display area and a fan-out area, the GOA circuit comprising:
- a plurality of stage pre-charge modules, arranged for connecting output terminals of two adjacent gates in the GOA circuit in the fan-out area to two corresponding adjacent gate line outputs in the display area respectively, each of the stage pre-charge modules comprises:
- a first thin film transistor, a source and a gate of the first thin film transistor being connected to a first output terminal at one of the two adjacent gates, a drain of the first thin film transistor being connected to a first gate line output;
- a second thin film transistor, a gate of the second thin film transistor being connected to the first output terminal at the one gate, a drain of the second thin film transistor being connected to a previous stage pre-charge module;
- a third thin film transistor, a gate of the third thin film transistor being connected to the first output terminal at the one gate, a drain of the third thin film transistor being connected to the first gate line output;
- a fourth thin film transistor, a drain of the fourth thin film transistor being connected to a source of the third thin film transistor; a gate of the fourth thin film transistor being connected to a second output terminal at the other of the two adjacent gates, a source of the fourth thin film transistor being connected to a second gate line output;
- a fifth thin film transistor, a gate of the fifth thin film transistor being connected to the second output terminal at the other gate, a source of the fifth thin film transistor being connected to the second output terminal, a drain of the fifth thin film transistor being connected to the second gate line output; and
- a sixth thin film transistor, a gate of the sixth thin film transistor being connected to the second output terminal at the other gate, a drain of the sixth thin film transistor being connected to the second gate line output, a source of the sixth thin film transistor being connected to a next stage pre-charge module.

7. The GOA circuit of claim 6, wherein when the first gate output terminal is a high voltage level bit, the second gate output terminal is a low voltage level bit, the first thin film transistor, the third thin film transistor, and the fourth thin film transistor are turned on, the second thin film transistor, the fifth thin film transistor, and the sixth thin film transistor are turned off, and the first gate line output and the second gate line output are both high voltage level bits.

8. The GOA circuit of claim 6, wherein when the first gate output terminal is a low voltage level bit, the second gate output terminal is a high voltage level bit, the first thin film transistor, the third thin film transistor, and the fourth thin film transistor are turned off, the second thin film transistor, the fifth thin film transistor, and the sixth thin film transistor are turned on, and the first gate line output is a low voltage level bit, the second gate line output is a high voltage level bit.

9. The GOA circuit of claim 6, wherein when the first gate output terminal and the second gate output terminal are both low voltage level bits, the first thin film transistor, the third thin film transistor, the fifth thin film transistor, and the sixth thin film transistor are turned off, the second thin film transistor and the fourth thin film transistor are turned on, and the first gate line output and the second gate line output are both low voltage level bits.

* * * * *